United States Patent
Lee et al.

(10) Patent No.: US 8,816,560 B2
(45) Date of Patent: Aug. 26, 2014

(54) CANNED MOTOR FOR REDUCING COGGING TORQUE

(75) Inventors: Seung Yong Lee, Gyeonggi-do (KR); Jea Woong Yi, Gyeonggi-do (KR); Chi Myung Kim, Gyeonggi-do (KR); Hark Koo Kim, Gyeonggi-do (KR); Yun Seok Kim, Gyeonggi-do (KR); Yong Sun Park, Gyeonggi-do (KR); Bong Sang Lee, Gyeonggi-do (KR); Tae Sung Oh, Gyeonggi-do (KR); Yu Man Won, Gyeonggi-do (KR)

(73) Assignees: Hyundai Motor Company, Seoul (KR); Kia Motors Corporation, Seoul (KR); Myunghwa Ind. Co., Ltd., Seoul (KR)

( * ) Notice: Subject to any disclaimer, the term of this patent is extended or adjusted under 35 U.S.C. 154(b) by 207 days.

(21) Appl. No.: 13/546,229

(22) Filed: Jul. 11, 2012

(65) Prior Publication Data

US 2013/0119818 A1      May 16, 2013

(30) Foreign Application Priority Data

Nov. 16, 2011   (KR) .................... 10-2011-0119292

(51) Int. Cl.
    *H02K 3/487*     (2006.01)
    *H02K 3/48*      (2006.01)
(52) U.S. Cl.
    CPC . *H02K 3/48* (2013.01); *H02K 3/487* (2013.01)
    USPC ..................................................... 310/214
(58) Field of Classification Search
    None
    See application file for complete search history.

(56) References Cited

U.S. PATENT DOCUMENTS

| | | | | |
|---|---|---|---|---|
| 4,761,581 A | * | 8/1988 | Watanabe et al. | 310/214 |
| 5,124,607 A | * | 6/1992 | Rieber et al. | 310/214 |
| 7,919,896 B2 | * | 4/2011 | Takeshita et al. | 310/214 |
| 2002/0074889 A1 | * | 6/2002 | Kikuchi et al. | 310/214 |
| 2009/0289520 A1 | * | 11/2009 | Takeshita et al. | 310/214 |

FOREIGN PATENT DOCUMENTS

| | | |
|---|---|---|
| JP | 59103538 A | 6/1984 |
| JP | 59226634 A | 12/1984 |
| JP | 60234443 A | 11/1985 |
| JP | 61052132 A | 3/1986 |
| JP | 64-055024 U | 2/1989 |
| JP | 64-055024 U | 4/1989 |
| JP | 09280190 A | 10/1997 |
| JP | 2006-121870 A | 5/2006 |
| JP | 2007049866 A | 2/2007 |
| KR | 10-2006-0116704 | 11/2006 |

* cited by examiner

*Primary Examiner* — Tran Nguyen
(74) *Attorney, Agent, or Firm* — Edwards Wildman Palmer LLP; Peter F. Corless

(57) ABSTRACT

Disclosed is a canned motor for restraining a cogging torque from being generated by inserting magnetic metal pins into slot openings of a stator, thereby reducing noise and vibrations during an operation of the canned motor. The canned motor includes: a can inserted into a housing to seal a coil mounted within the housing; and a stator installed on an outer peripheral surface of the can and inserted along an inner peripheral surface of the housing. A plurality of fixing guides protrude from an outer peripheral surface of the can and metal pins are inserted into the fixing guides to be integral with the fixing guide, such that the metal pins are inserted into and attached to slot openings of the stator when inserted into the stator.

6 Claims, 4 Drawing Sheets

CANNED MOTOR FOR REDUCING COGGING TORQUE

CROSS-REFERENCE TO RELATED APPLICATION

This application claims under 35 U.S.C. §119(a) the benefit of Korean Patent Application No. 10-2011-0119292 filed on Nov. 16, 2011, the entire contents of which are incorporated herein by reference.

BACKGROUND (a) Technical Field

The present invention relates to a canned motor for reducing a cogging torque. More particularly, it relates to a canned motor for restraining a cogging torque from being generated by inserting magnetic metal pins into slot openings of a stator, thereby reducing noise and vibrations during the operation of the canned motor.

(b) Background Art

A canned pump is generally used to increase a hydraulic pressure, e.g., a pump motor. The canned pump is configured so that a coil of a motor, i.e., a power source of the pump, is sealed by a "can" enclosure and the water compressed by the pump reciprocates between a rotary shaft and a rotor received within the can so that the water that is cooling the frictional heat generated by a rotating body in an appropriate way can act as a lubricant around the rotational friction part. A canned pump is generally manufactured by integrating an impeller and a motor. That is, a canned motor, i.e., a power source of a canned pump, is generally integrally coupled to the canned motor so as to prevent leakage of liquid.

Referring to FIG. 1, a conventional canned motor includes a housing 1 having a certain volume, a stator 2 installed on an inner peripheral surface of the housing 1, a coil (not shown) installed at a periphery of the stator 2 to create an electromagnetic interaction between the stator 2 and a rotor 3, a can 4 inserted into the housing 1 so as to seal the coil and the stator 2, a rotor 3 received and rotatably installed within the can by an electromagnetic interaction, and a rotary shaft 5 press-fitted with the rotor 3 to be rotated in conjunction with the rotor 3.

An impeller 6 of a pump is coupled to one end of the rotary shaft 5, and as the rotor 3 is rotated, the impeller 6 is rotated in conjunction with the rotary shaft 5 to suck and discharge water. The can 4 serves to prevent water from being leaked to the outside of the can 4 within which a coil is installed, and is generally made of polyphenylene sulfide (PPS).

As illustrated in FIG. 2, the stator 2 is installed on an outer peripheral surface of the can 4. If an electric power is applied to the coil, the stator 2 rotates and drives the rotor 3 due to an electromagnetic interaction with the rotor 3. A plurality of slots 7 are circumferentially formed in the stator 2, and slot openings 8 having a size of approximately 0.8 mm are formed between the slots 7 and the can 4. Although the conventional canned motor has a simple structure and excellent waterproofing performance, a high cogging torque is generated due to the slot openings of the stator, severely causing noise and vibrations.

SUMMARY OF THE DISCLOSURE

The present invention provides a canned motor for reducing a cogging torque, by which a cogging torque due to slot openings of a stator is reduced by integrally forming magnetic metal pins on an outer peripheral surface of a can through insert injection-molding and inserting the metal pins into the slot openings of the stator when the can and the stator are assembled.

In one aspect, the present invention provides a canned motor for reducing a cogging torque, the canned motor including: a can inserted into a housing to seal a coil mounted within the housing; and a stator installed on an outer peripheral surface of the can and inserted along an inner peripheral surface of the housing, wherein a plurality of fixing guides protrude from an outer peripheral surface of the can and metal pins are inserted into the fixing guides to be integral with the fixing guide. More specifically, the metal pins are inserted into and attached to slot openings of the stator when inserted into the stator.

In some exemplary embodiments, the can may be formed together with the metal pins by insert-molding such that the metal pins are stuck within the fixing guides. Additionally, left and right sides of the fixing guides which contact the slot openings of the stator may be opened so that the inserted metal pins can directly contact the stator. Also, metal pin may be formed of a magnetic material.

Since the canned motor of the present invention has a structure where magnetic metal pins are inserted into slot openings of a stator, a cogging torque due to the slot openings is reduced, making it possible to reduce a torque ripple, noise, and vibrations and improve motor efficiency. The canned motor of the present invention also reinforces the strength and reliability of the can motor by forming fixing guides on an outer peripheral surface of the can, thereby improving reliability. Further, the fixing guides of the can are matched with the slot openings of the stator, making it possible to prevent slippage of the stator.

BRIEF DESCRIPTION OF THE DRAWINGS

The above and other features of the present invention will now be described in detail with reference to certain exemplary embodiments thereof illustrated in the accompanying drawings which are given herein below by way of illustration only, and thus are not limitative of the present invention, and wherein.

DETAILED DESCRIPTION

Figure 1:
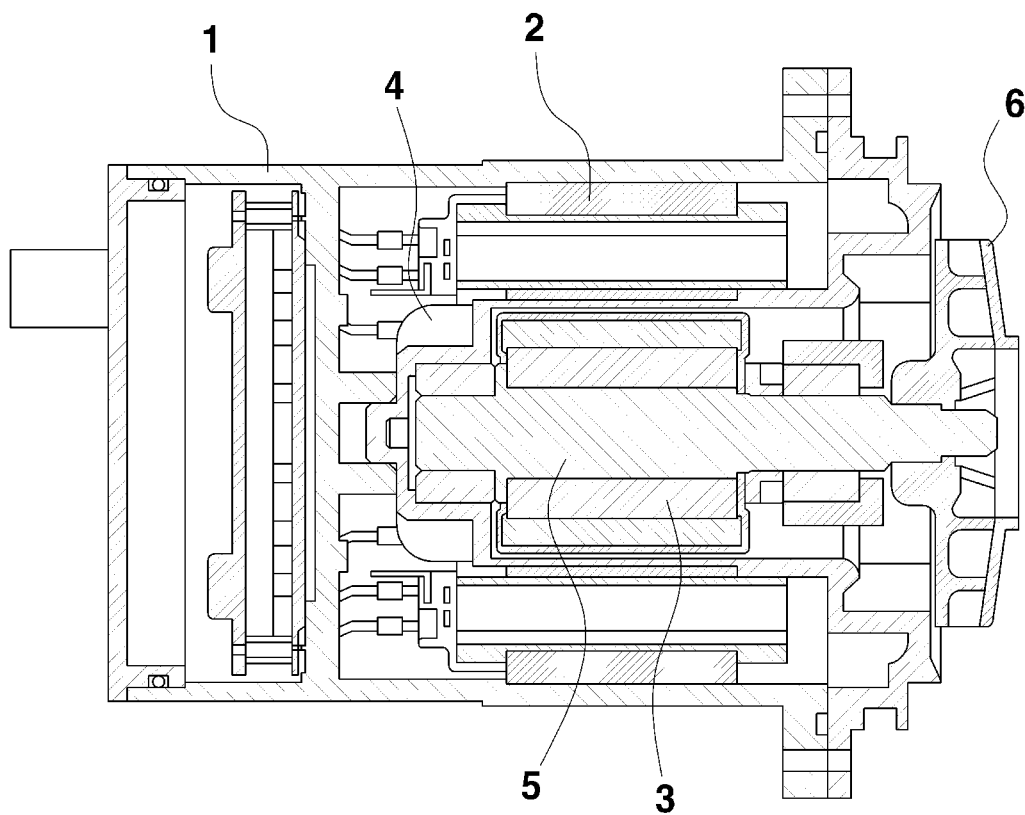
FIG. 1 is a sectional view illustrating a conventional canned motor.
Figure 2:
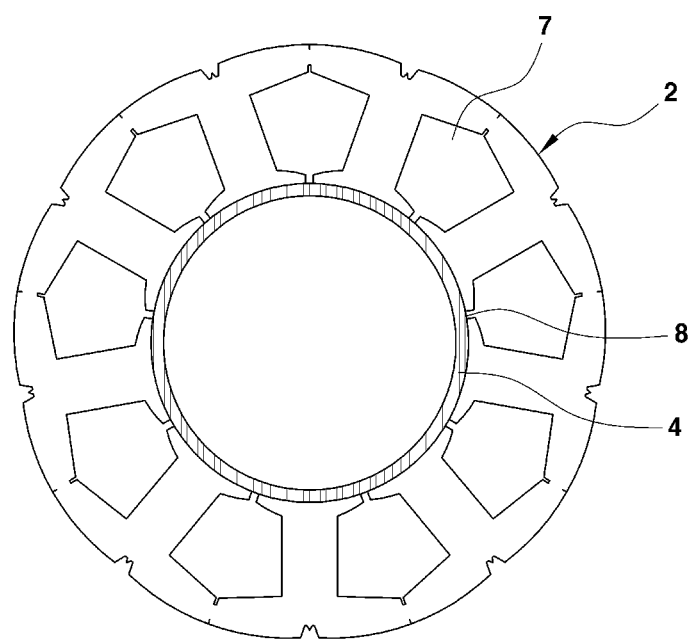
FIG. 2 is a sectional view illustrating an assembled structure of a can and a stator of the conventional canned motor.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

As well known in the art, a canned motor generally includes a housing having a certain volume, a stator installed on an inner peripheral surface of the housing, a coil installed at a periphery of the stator to create an electromagnetic interaction between the stator and a rotor, a can inserted into the housing so as to seal the coil and the stator, a rotor received and rotatably installed within the can by an electromagnetic interaction, and a rotary shaft press-fitted with the rotor to be rotated in conjunction with the rotor.

An impeller of, e.g., a pump, is coupled to one end of the rotary shaft, and as the rotor rotates, the impeller is rotated in conjunction with the rotary shaft to suck and discharge water. The can serves to direct and retain the flow of water so that water cannot be leaked to the outside of the can where a coil is wired.

The stator is installed on an outer peripheral surface of the can and the stator is fixed to an inner wall surface of the housing, so that when electric power is applied to the coil, the rotor is rotated and driven due to an electromagnetic interaction with the rotor. A plurality of slots are formed circumferentially in the stator, and slot openings having a predetermined size are formed between the slots and an inner wall surface (an inner peripheral surface of the stator which the can contacts).

According to the present invention, in a canned motor including a can 10 and a stator 20, the stator 20 has closed slots 21 without any opened section by inserting magnetic metal pins 12 into slot openings 22, restraining a cogging torque generated due to the slot openings 22 of the stator 20.

Figure 3:
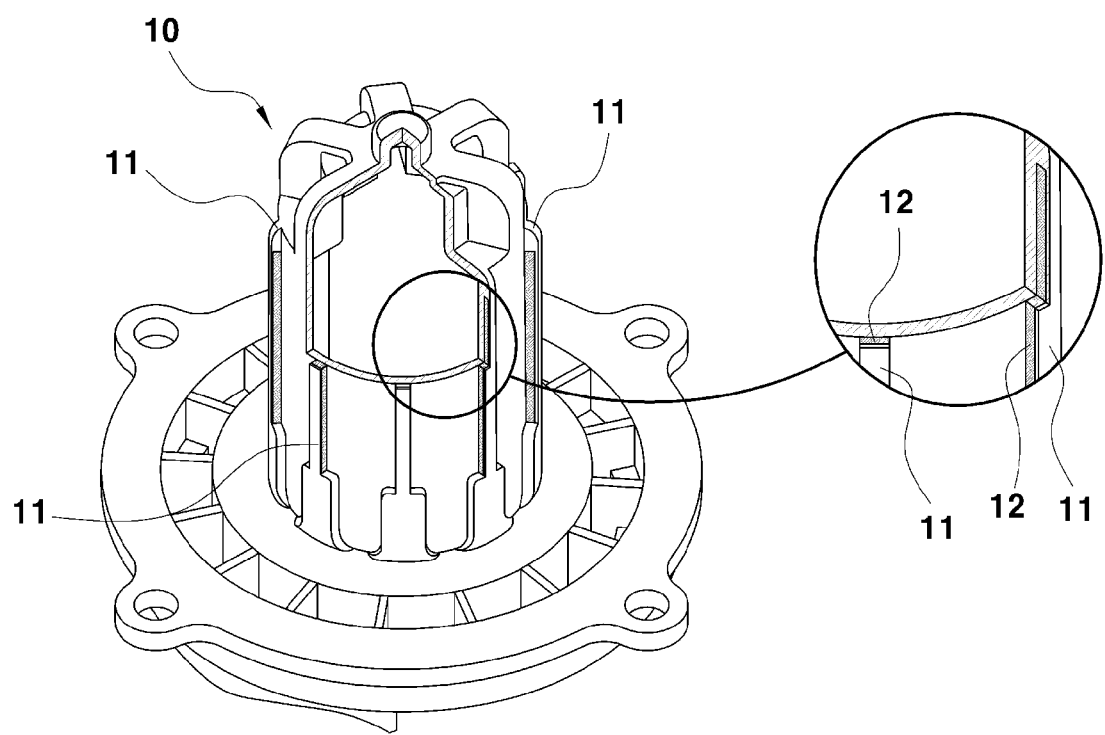
FIG. 3 is a perspective view illustrating a can of a canned motor according to an embodiment of the present invention.

To this end, as illustrated in FIG. 3, the canned motor for reducing a cogging torque according to the present invention includes a can 10 having a plurality of fixing guides 11 formed circumferentially on an outer peripheral surface thereof and metal pins 12 inserted within the fixing guide 11. The fixing guides 11 integrally protrude from an outer peripheral surface of the can 10 when the can 10 is, e.g., injection-molded, and the metal pins 12 are installed in the can 10 while being inserted within the fixing guides 11 by, e.g., insert-molding.

Since an injection-molding resin may be injected into a mold to form an injection-molded part while another part is inserted within a certain portion of the mold during an insert-molding process, the inserted part is integrally formed as a portion of the injection-molded part in this embodiment of the present invention. Accordingly, as the can 10 and the metal pins 12 are insert-molded in this embodiment of the present invention, the metal pins 12 are integrally formed on an outer peripheral surface of the can while being inserted into the fixing guides 11. The fixing guide 11 extends in a direction perpendicular to a circumferential direction of the can 10, and the metal pins 12 are inserted into and bonded to the fixing guide 11.

The can 10 and the metal pins 12 are integrally formed though, e.g., insert-molding so that the metal pins 12 are stuck within the fixing guides 11 of the can 10. Thus, the metal pins 12 are prevented from being separated from the fixing guides 11 of the can 10.

Figure 4:
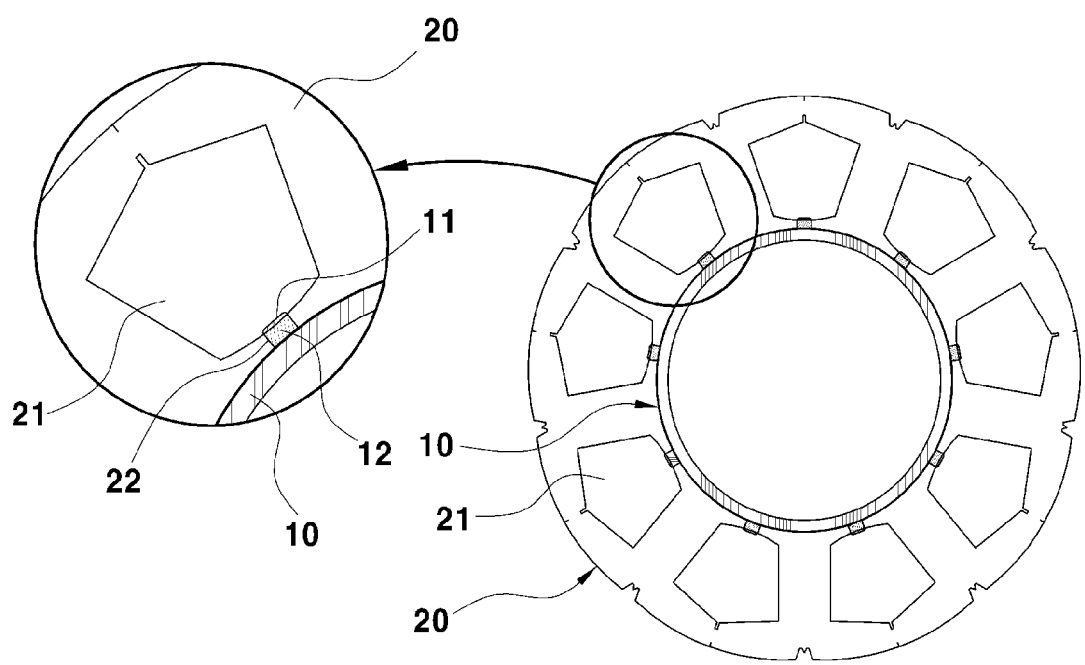
FIG. 4 is a sectional view illustrating an assembled structure of the can and a stator of the canned motor according to the embodiment of the present invention.

As illustrated in FIGS. 3 and 4, left and right ends of the inserted metal pins 12 are exposed by opening on the left and right sides of the fixing guides 11 contacting the slot openings 22 of the stator 20. That is, since the metal pins 12 are stuck to inner wall surfaces of the fixing guides 11, they are prevented from being separated from the fixing guides 11 even if portions of the fixing guides 11 are opened when the fixing guides 11 are formed. Thus, as illustrated in FIG. 3, the metal pins 12 are allowed to directly contact the stator 20 by exposing left and right ends of the metal pins 12 formed so that left and right ends of the fixing guides 11 are opened lengthwise and inserted into the fixing guides 11.

That is, as the fixing guides 11 are inserted into the slot openings 22 of the stator 20 when the can 10 is inserted into the stator 20, the metal pins 12, opposite ends of which are exposed as in FIG. 4, are inserted into the slot openings 22 to be matched with the slot openings 22, and the metal pins 12 are attached to the slot openings 22 to directly contact the stator 20. Thus, the stator 20 is installed on an outer peripheral surface of the can 10 to have the slots 21 having the closed slot openings 22. Moreover, the metal pins 12 inserted into and matched with the slot openings 22 are formed of a magnetic material.

Meanwhile, the fixing guides 11 protrude from an outer peripheral surface of the can 10 to reinforce the can 10, and also serve to guide an assembling location when the stator 20 is assembled with the can 10. Further, the canned motor of the present invention can prevent slippage of the stator 20 by inserting the metal pins 12 of the can 10 into the slot openings 22 of the stator 20 and matching the metal pins 12 with the slot openings 22.

As described above, the canned motor of the present invention includes a can 10 inserted into a housing to seal a coil mounted within the housing, and a stator 20 installed on an outer peripheral surface of the can 10 and inserted along an inner peripheral surface of the housing, wherein metal pins 12 are installed on an outer peripheral surface of the can 10 to be inserted into the fixing guides 11 to be integral with the fixing guides 11.

What is claimed is:

1. A canned motor for reducing a cogging torque, the canned motor comprising:
   a can inserted into a housing to seal a coil mounted within the housing; and
   a stator installed on an outer peripheral surface of the can and inserted along an inner peripheral surface of the housing,
   wherein a plurality of fixing guides protrude from an outer peripheral surface of the can and metal pins are inserted into the fixing guides to be integral with the fixing guide,
   wherein the metal pins are inserted into and attached to slot openings of the stator when inserted into the stator.

2. The canned motor of claim 1, wherein the can is formed together with the metal pins via insert-molding to secure the metal pins within the fixing guides.

3. The canned motor of claim 1, wherein left and right sides of the fixing guides which contact the slot openings of the stator are opened to allow the inserted metal pins to directly contact the stator.

4. The canned motor of claim 1, wherein the metal pin is formed of a magnetic material.

5. The canned motor of claim 1, wherein the metal pins reduce cogging torque.

6. The canned motor of claim 1, wherein the metal pins reduce noise and vibrations during an operation of the canned motor.

* * * * *